United States Patent
Grzyb et al.

(10) Patent No.: US 10,258,075 B2
(45) Date of Patent: Apr. 16, 2019

(54) CHARCOAL FUEL ARTICLE

(71) Applicant: CARBOPOL JANUSZ GRZYB, Zawiercie (PL)

(72) Inventors: Lukasz D. Grzyb, Zawiercie (PL); Janusz Grzyb, Zawiercie (PL); Sergey Evglevskiy, Moscow (RU)

(73) Assignee: CARBOPOL JANUSZ GRZYB, Zawiercie (PL)

( * ) Notice: Subject to any disclaimer, the term of this patent is extended or adjusted under 35 U.S.C. 154(b) by 318 days.

(21) Appl. No.: 15/068,009

(22) Filed: Mar. 11, 2016

(65) Prior Publication Data

US 2016/0262444 A1    Sep. 15, 2016

Related U.S. Application Data

(60) Provisional application No. 62/133,302, filed on Mar. 14, 2015.

(51) Int. Cl.
| | | |
|---|---|---|
| *C10L 5/36* | (2006.01) | |
| *A24B 15/16* | (2006.01) | |
| *A24F 1/30* | (2006.01) | |
| *A24F 9/00* | (2006.01) | |
| *C10L 5/44* | (2006.01) | |

(52) U.S. Cl.
CPC .............. *A24B 15/165* (2013.01); *A24F 1/30* (2013.01); *A24F 9/00* (2013.01); *C10L 5/361* (2013.01); *C10L 5/447* (2013.01); *C10L 2270/00* (2013.01); *Y02E 50/10* (2013.01); *Y02E 50/30* (2013.01)

(58) Field of Classification Search
CPC . A24B 15/165; A24F 1/30; A24F 9/00; C10L 5/361
See application file for complete search history.

(56) References Cited

U.S. PATENT DOCUMENTS

| | | |
|---|---|---|
| 4,243,393 A | 1/1981 | Christian |
| D272,758 S | 2/1984 | Koziol |
| 4,496,366 A | 1/1985 | Peters |
| 4,810,256 A | 3/1989 | Fay, III et al. |
| 4,834,774 A | 5/1989 | Fay, III et al. |
| 5,762,656 A | 6/1998 | Burke et al. |
| 6,074,446 A | 6/2000 | Fujino |
| 6,790,244 B2 | 9/2004 | Saunders et al. |
| 7,575,609 B2 | 8/2009 | Saunders et al. |
| 8,118,887 B2 | 2/2012 | Saunders et al. |

(Continued)

*Primary Examiner* — Anthony Calandra
*Assistant Examiner* — Jamel M Nelson
(74) *Attorney, Agent, or Firm* — Lawrence G. Fridman, Esq; Feigin & Fridman, LLC

(57) ABSTRACT

A charcoal article for use of a hookah tobacco pipe is provided. The article comprises a body extending between a top and bottom portions. Plurality of legs extends outwardly from a base surface disposed between the top and bottom portions. The legs are separated from each other by channels, and a recess is provided extending inwardly within the body from the base surface. An inner chamber is defined within the body by the walls of the legs and walls of the recess. The legs are configured for placement on a foil, having at least one perforation, covering a bowl with a smoking matter. Upon positioning of the article on the foil the heating chamber is positioned to coincide with or situated at the perforation within the foil.

15 Claims, 11 Drawing Sheets

(56) References Cited

U.S. PATENT DOCUMENTS

| | | |
|---|---|---|
| 2004/0222117 A1 | 11/2004 | Saunders et al. |
| 2006/0064926 A1 | 3/2006 | Melin et al. |
| 2006/0137244 A1 | 6/2006 | Melin et al. |
| 2006/0143976 A1 | 7/2006 | Leong |
| 2006/0162244 A1* | 7/2006 | Hsiao .................. C10L 5/36 44/532 |
| 2011/0314729 A1* | 12/2011 | Bahbah .................. C10L 11/04 44/620 |

* cited by examiner

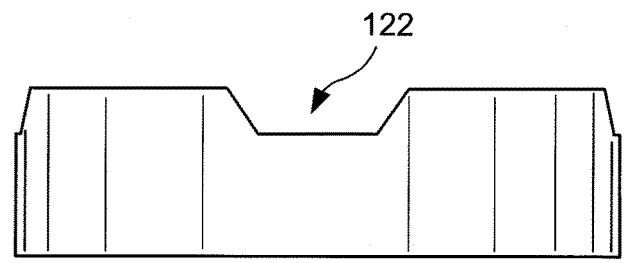
F I G. 12
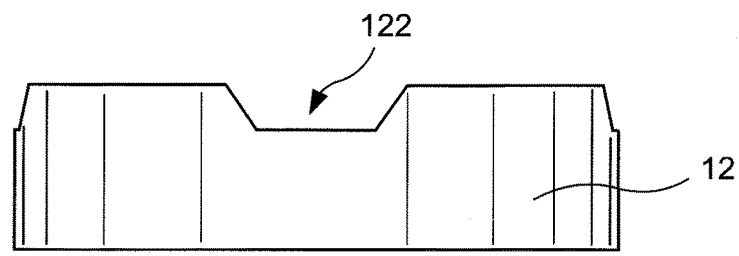
F I G. 13
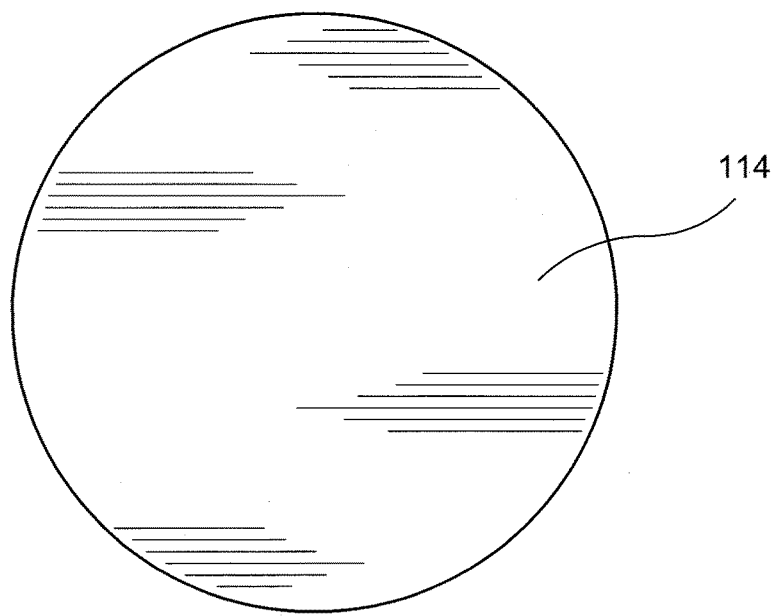
F I G. 14

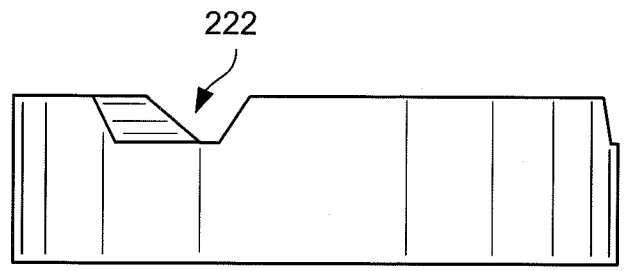
F I G. 19
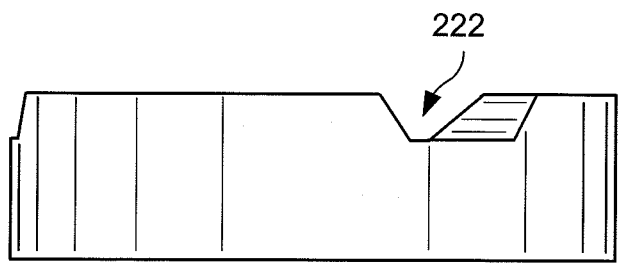
F I G. 20
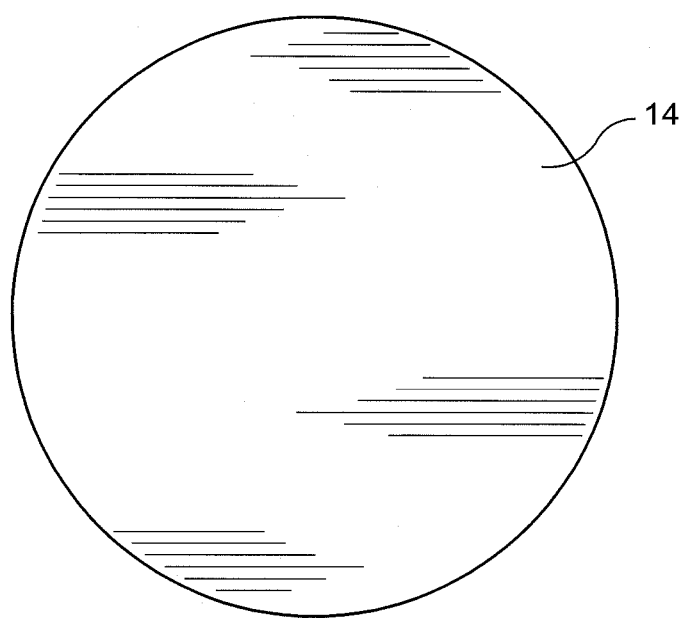
F I G. 21

CHARCOAL FUEL ARTICLE

REFERENCE TO RELATED APPLICATION

This Application claims priority of U.S. Provisional Application Ser. No. 62/133,302 filed by the inventors on Mar. 14, 2015, the entire disclosure of which is hereby incorporated by reference.

FIELD OF THE INVENTION

The invention relates to the field of charcoal articles, and more particularly it relates to charcoal fuel articles adapted for use with hookahs or hookah tobacco pipes.

BACKGROUND OF THE INVENTION

Smoking tobacco and other smoking matter such as various herbs, spices, and other plant matter has been a tradition for centuries. Many devices have been developed to assist in the smoking of such smoking matter, including various types of pipes and hookahs.

Today hookahs are readily available for sale at smoke shops across the globe, along with a variety of tobacco brands and accessories. In addition to private hookah smoking, hookah lounges and bars have opened and hookahs have been growing in popularity.

A hookah pipe contains a tobacco or smoking matter in a bowl disposed at its top of the portion. Burning charcoal is placed on top of a heating platform covering the bowl, so as to heat the tobacco, thereby causing the tobacco to smoke.

A variety of charcoal fuel articles is available for use with hookah pipes, typically in the form of solid and semi-solid briquettes and tablets. It is known that such conventional design in the prior art of charcoal articles does not provide desired temperature distribution among various parts of the articles so as to cause uniform heating of the smoking matter or tobacco. Furthermore, solid charcoal briquettes and tablets are often disposed in a very close proximity of the tobacco mixture. This causes highly undesirable scorching occurring when the hot charcoals are placed too close to the tobacco mixture.

Thus, it has been a long felt and unsolved need to provide a charcoal article for use with the hookah pipes, which avoids the drawbacks of the prior art in general. More specifically, there is a need for a charcoal article capable of providing uniform temperature distribution throughout its body and having the main active portions spaced from the heating platform, so as to minimize a possibility of the undesirable scorching. Still further, there is a need for a charcoal article design, facilitating heat transfer by means of air stream convection.

SUMMARY OF THE INVENTION

One aspect of the invention provides a charcoal article comprising a substantially cylindrical body extending between top and bottom portions, a plurality of legs extends outwardly from a base surface provided between the top and bottom portions, the legs are separated from each other by channels, a recess extends inwardly within the body of the charcoal article from the base surface, an inner chamber is formed between the walls of the legs and walls of the recess.

As to another aspect of the invention, each leg is formed having a substantially pyramidal configuration defined by the first and second side walls positioned at an angle to each other and interconnected by a peripheral wall, the side walls are positioned at an angle to the base surface, the legs are terminated by an end wall interconnecting the side walls and the peripheral wall.

As to a further aspect of the invention, the peripheral wall is formed having an arch-shaped configuration, each channel is formed by the side walls of the adjacent legs and a segment of the base surface positioned therebetween, the recess is formed by circumferential wall connecting the base with a ceiling of the chamber. The inner chamber is defined by at least the curved peripheral walls of the legs and the circumferential wall of the recess.

As to a still further aspect of the invention, the charcoal article for use with a hookah pipe is provided, wherein the charcoal article comprises a body extending between top and bottom portions, an inner chamber is formed at the bottom portion by a plurality of legs extending outwardly from a base surface disposed between the top and bottom portions. The legs are separated from each other by channels, and a recess extending inwardly within the body of the article from the base surface is provided. A foil or heating platform having at least one perforation covers a bowl containing a smoking matter. The heating chamber is defined by the walls of the legs, walls of the recess and the foil, wherein the legs are configured for placement on the foil, so that the heating chamber is positioned to coincide with or positioned at the perforation within the foil.

As to still another embodiment of the invention, each time a user breathes in through the hookah pipe, air is pulled through the channels into the heating chamber, thereby feeding the heating chamber with heat-maintaining air from various directions of the respective channels, so as to form a swirl/vortex directed along the semi-spherical surface of the inner chamber, further improving and stabilizing temperature distribution along various parts of the charcoal article and the inner chamber.

BRIEF DESCRIPTION OF THE DRAWINGS

FIG. 12 is a right hand side elevational view thereof;

FIG. 13 is a left hand side elevational view thereof;

FIG. 14 is a bottom plan view thereof;

FIG. 19 is a right hand side elevational view thereof;

FIG. 20 is a left hand side elevational view thereof;

FIG. 21 is a bottom plan view thereof;

DETAILED DESCRIPTION OF THE INVENTION

Figure 1:
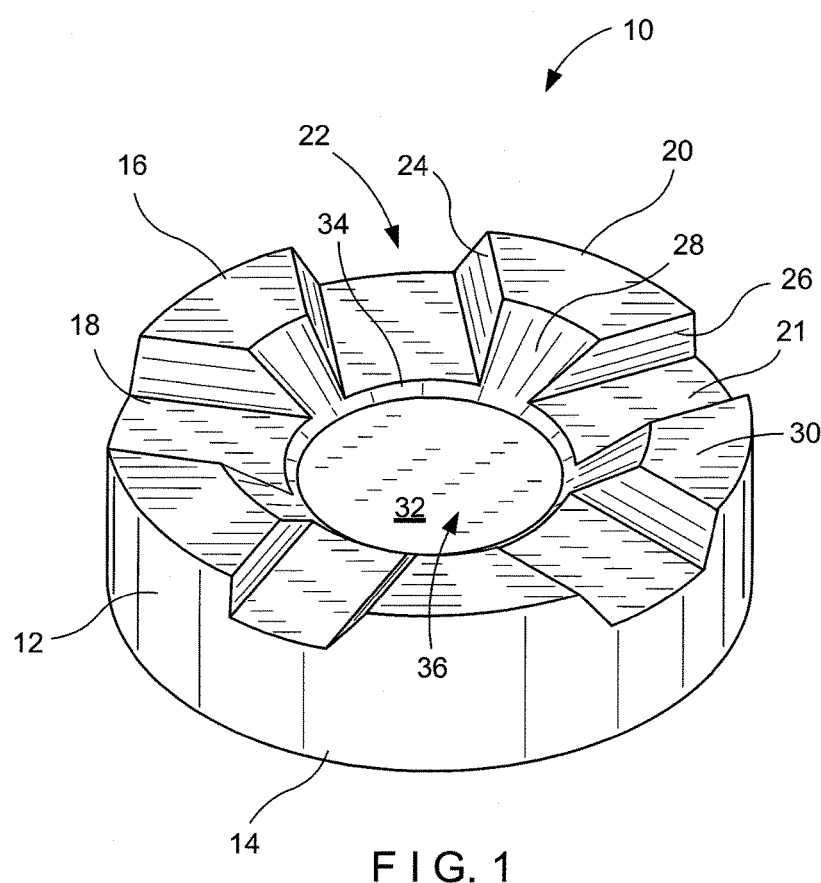
FIG. 1 is a perspective view of a first embodiment of a charcoal fuel article of the invention in an inverted position.
Figure 4:
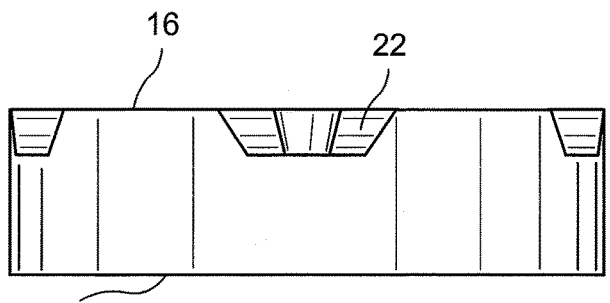
FIG. 4 is a rear elevational view thereof.
Figure 2:
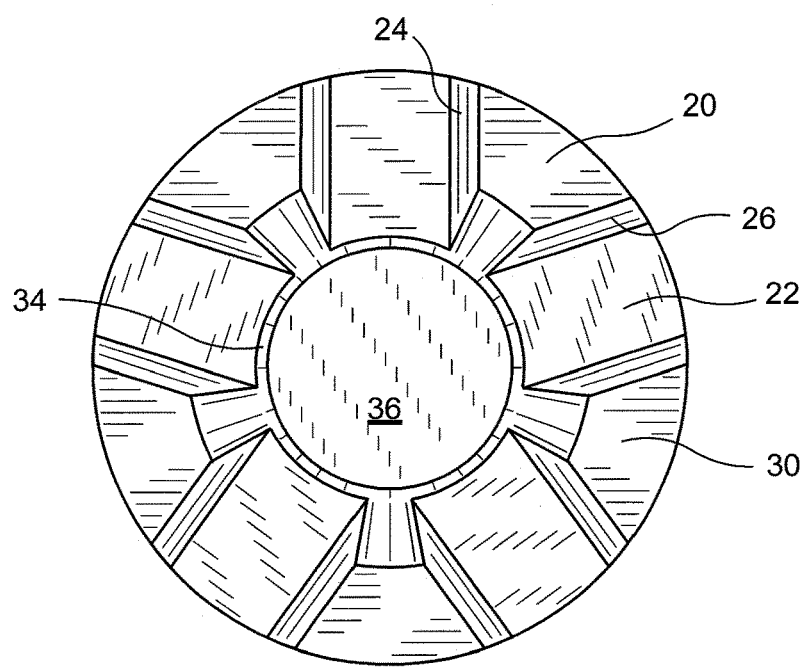
FIG. 2 is a top plan view thereof.
Figure 3:
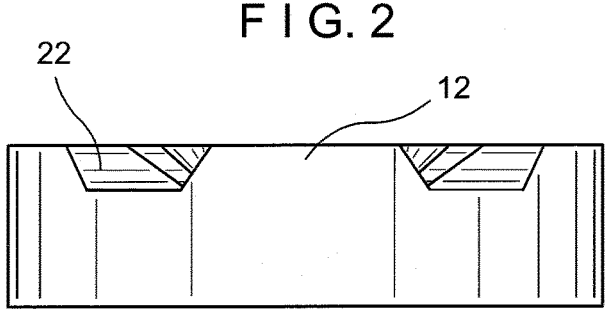
FIG. 3 is a front elevational view thereof.
Figure 5:
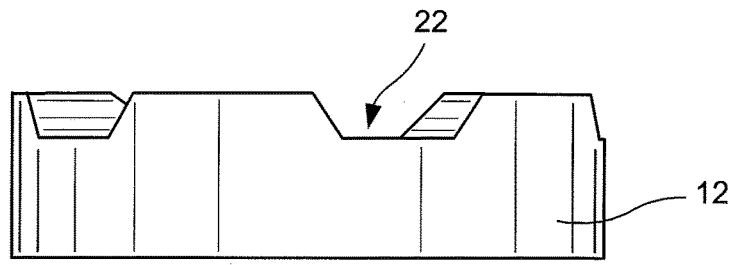
FIG. 5 a right hand side elevational view thereof.
Figure 6:
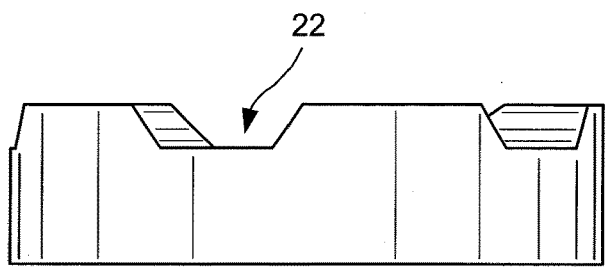
FIG. 6 is a left side elevational view thereof.
Figure 7:
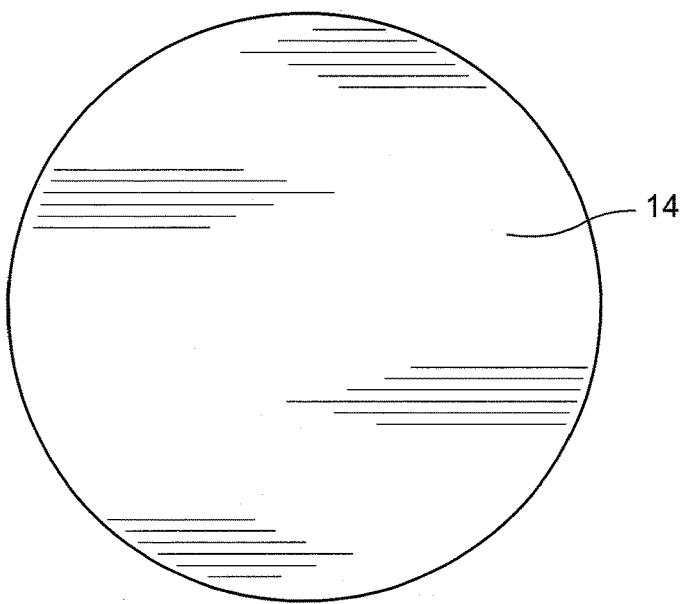
FIG. 7 is a bottom view thereof.

The reference is now made to FIGS. 1-7 illustrating a preferred embodiment of a charcoal article 10 of the invention in an inverted position. The article 10 is formed having a substantially cylindrical body 12 extending between a top or a main active portion 14 and a bottom portion 16. In the illustrated embodiment, an upper surface of the top portion is substantially flat. However, any shape of the upper surface is within the scope of the invention. The bottom portion 16 defining a heating area 18 of the charcoal article is formed by a plurality of legs/prongs 20 extending outwardly from the base surface 21 provided approximately at one third distance between the top and bottom portions. As best illustrated in FIGS. 1 and 2, the legs/prongs are separated from each other by respective air passage channels 22. In the preferred embodiment of the invention, each leg/prong 20 is formed having a substantially pyramidal configuration defined by first 24 and second 26 sidewalls positioned at an angle to each other and interconnected by a peripheral wall 28. The side walls are also positioned at an angle to the base surface 21. Each leg is terminated by the leg end wall 30 interconnecting the side walls and the peripheral wall. In use the end walls 30 of the legs are adapted for engagement with a top surface of the foil of the hookah. In the preferred embodiment, the end walls 30 are substantially parallel to the top portion 14 of the charcoal article, whereas the inclined sidewalls 24, 26 are substantially flat. The peripheral wall 28 has an arc shaped/curved configuration. Each air passage channel 22 is formed by sidewalls of the adjacent legs/prongs 20 and a segment of the base surface 21 positioned therebetween. A semi-conical recess 32 extends inwardly within a central part of the body of the charcoal article from the base surface 21, and is defined by a circumferential wall 34 extending between the base surface and the ceiling 38.

As further best illustrated in at least FIGS. 1 and 2, an inner chamber 36 is defined within the charcoal article 10 by at least the peripheral walls 28 of the legs and the circumferential wall 34 and the ceiling 38 of the recess. The peripheral walls 28 of the legs and the circumferential wall 34 of the recess can be formed as parts of the same truncated semi-spherical body.

It will be discussed below that upon positioning of the charcoal fuel article 10, on the foil 60 of a hookah, a heating chamber 64 is defined between the inner chamber 36 and the top surface of the foil 60. To enhance usage of the charcoal article, it is preferred to orient the inner chamber 36 and the heating chamber in a close vicinity of the heating passages 62 within the foil, so as to provide improved communication between the heating chamber 64 and the interior of the bowl 52 containing the smoking matter or a tobacco.

Figure 8:
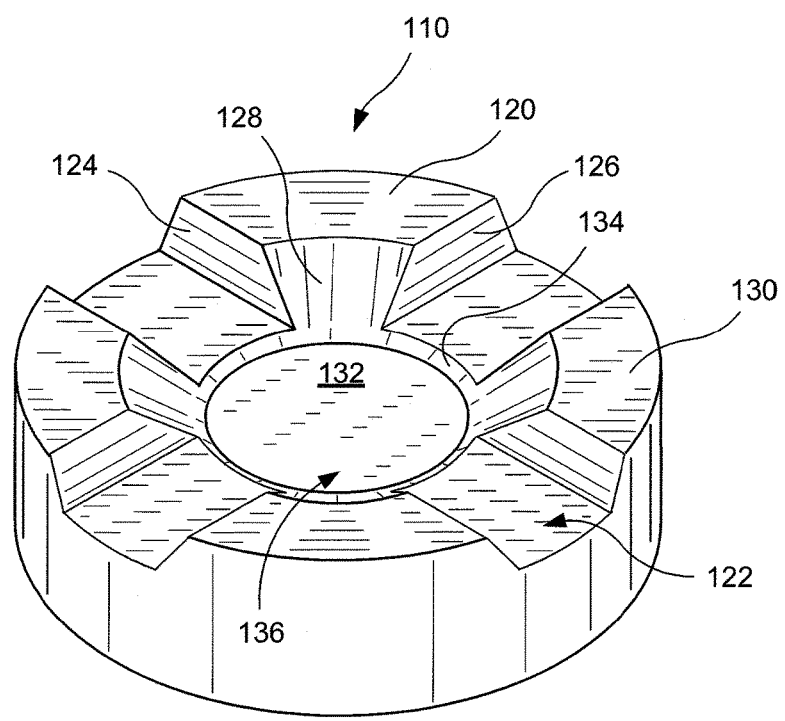
FIG. 8 is a perspective view of another embodiment of the charcoal fuel article of the invention an inverted position.
Figure 11:
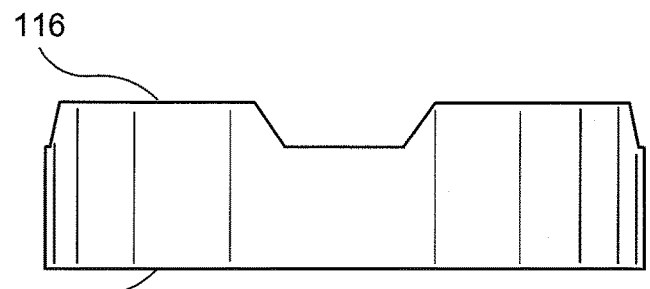
FIG. 11 is a rear elevational view thereof.
Figure 9:
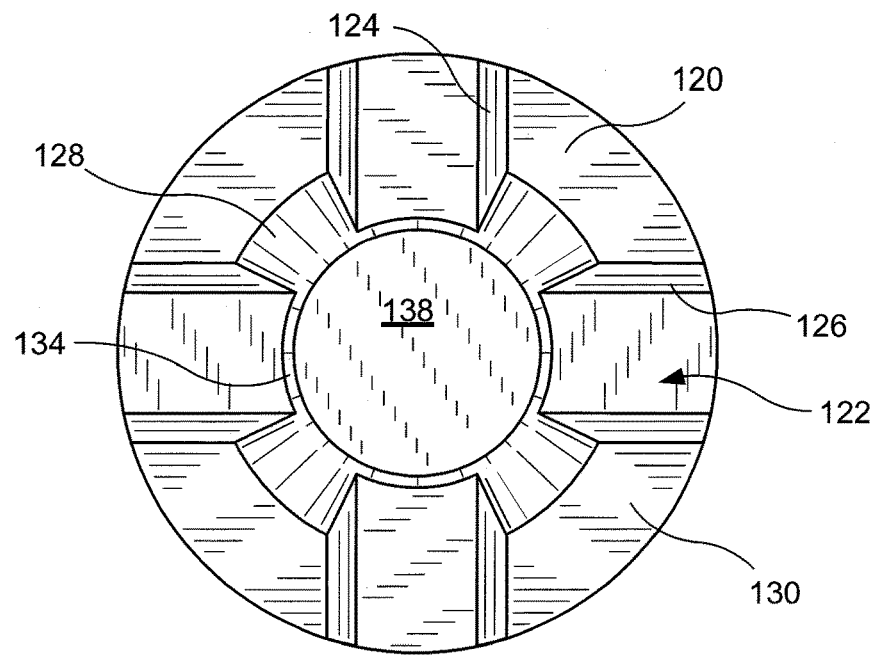
FIG. 9 is a top plan view thereof.
Figure 10:
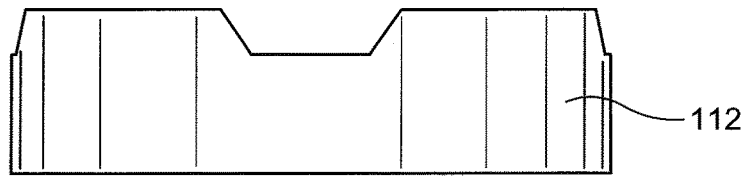
FIG. 10 is a front elevational view thereof.
Figure 15:
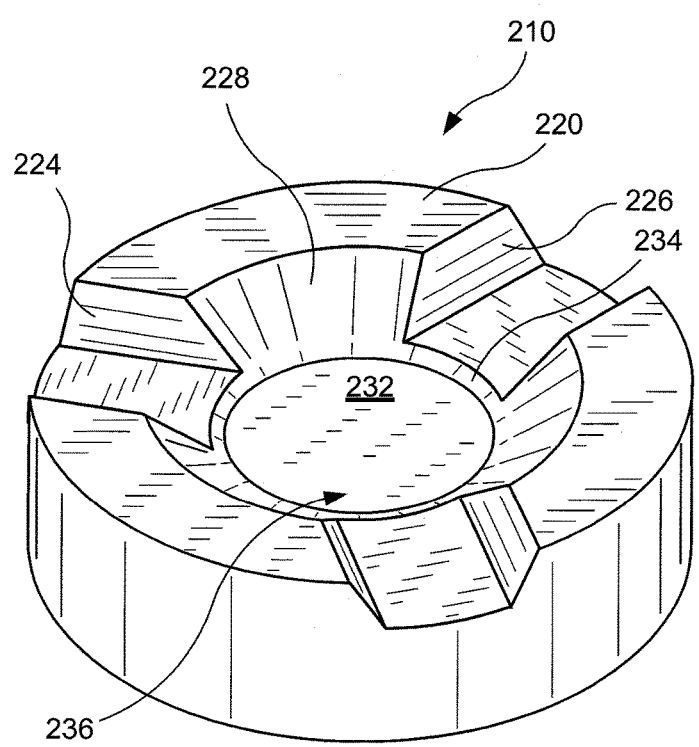
FIG. 15 is a perspective view of a further embodiment of the charcoal fuel article of the invention an inverted position.
Figure 18:
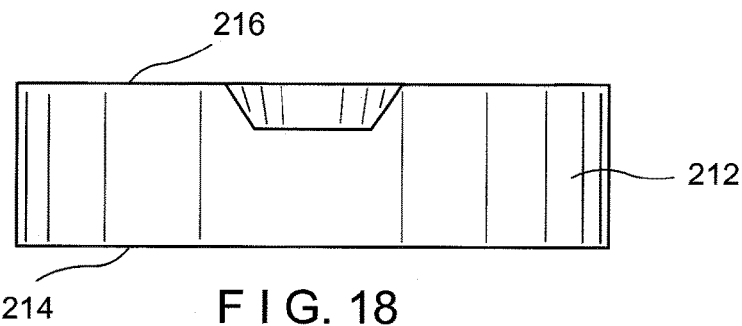
FIG. 18 is a rear elevational view thereof.
Figure 16:
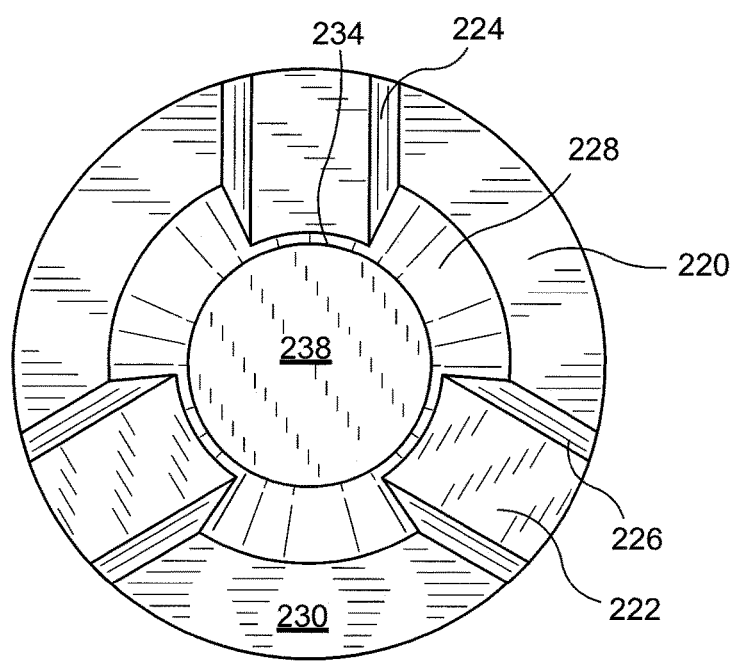
FIG. 16 is a top plan view thereof.
Figure 17:
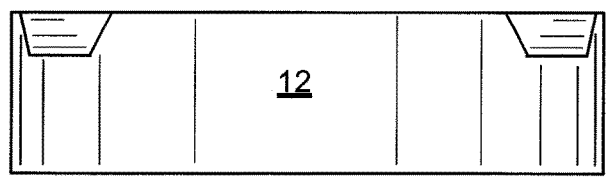
FIG. 17 is a front elevational view thereof.
Figure 22:
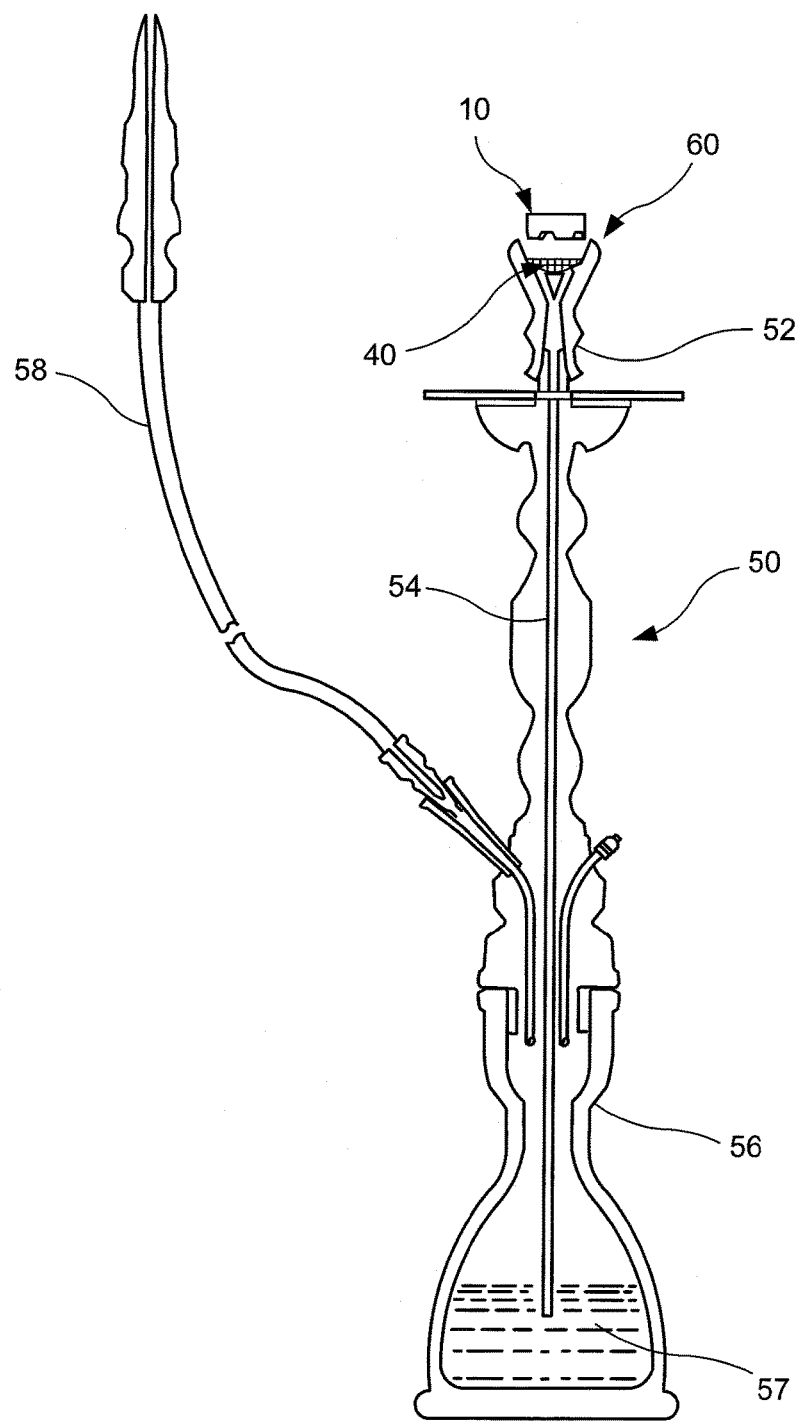
FIG. 22 is a schematic diagram illustrating a hookah pipe adapted for use with a charcoal fuel article of the invention.

In the preferred embodiment of the invention illustrated in FIGS. 1-7, the charcoal fuel article 10 is formed with five prongs/legs 20 separated by the respective channels 22. In the embodiment of FIGS. 8-14, a charcoal fuel article 110 is formed with four prongs/legs 120 separated by the channels 122. As best illustrated in FIGS. 8 and 9, each leg 120 has a greater degree of extension along the outer periphery of the body 112 and the channels 122 are wider than in the embodiment of FIGS. 1-7. In the embodiment of FIGS. 8-14 elements of the invention not mentioned above have numeral similar to that of the embodiment FIGS. 1-7.

FIGS. 15-21 illustrate still another embodiment of the charcoal fuel article of the invention formed with three prongs/legs 220 separated by the respective channels 222. Each leg 220 has a greater degree of extension along the outer periphery of the body 212 and has wider channels 222 compared to the previously discussed embodiments. In the embodiment of FIGS. 15-21 elements of the invention not mentioned above have numeral similar to that of the embodiment FIGS. 1-7.

It should be understood that the present invention as depicted in FIGS. 1-21 preferably describes and discloses charcoal article with a predetermined number of legs and channels. However, it should be realized that the greater number of legs/channels, the narrower the individual channels will become. The depth of the channels is defined by the width-to-depth proportion.

In general, hookah is a mechanism through which smoke from smoking material is drawn into and bubbled through a liquid prior to being inhaled through one or more hoses including one of more valves. Although a hookah associated with the charcoal article of the invention will be discussed as having the illustrated components, hookah and its components may have a variety of different sizes, shapes and configurations.

The main parts to a hookah 50 include a tray or bowl 52 for the smoking matter or tobacco 40, a hollow tube 54 providing an air passage between the bowl 52 and a water jar 56, and at least one hose 58 that provides an air passage from the water jar to the person smoking the hookah. Smoke is drawn from the heated tobacco 40 in the bowl 52, down the hollow tube 54, into the water jar 56, and from the water jar through the hose 58 to the smoker. Although smoking matter 40 other than tobacco can be smoked, smoking tobacco is most common and will be referred to herein as the smoking matter, but it is to be understood that any suitable smoking matter can be used.

The hookah pipe 50 holds the smoking matter 40 in the bowl 52 at the top of the hookah. Placement of the charcoal article 10 proximate to the smoking matter 40 involves spreading the foil or heating platform 60 upon the top of the bowl 52, punching the foil, so as to form holes or heating passages 62. Burning charcoal fuel articles 10 is placed on top of the heating platform 60 so as to heat the tobacco 40, thereby causing the tobacco to smoke. The end walls 30 of the charcoal fuel article 10 rest on top of the foil or heating platform 60. The inner chamber 36 disposed at the bottom portion of the article directs the largest amount of heat to the tobacco adjoining the heating platform, resulting in the desired smoke. The foil or heating platform 60, among other functions, separates the charcoal and the tobacco so as to minimize inhalation of coal ash with the smoke. The bowl 52 is preferably made from a heat resistant material having a low heat conductance, such as ceramic, for example. The foil or heating platform 60 and the heating passages or holes 62 are sized and shaped so that the fuel article 10 can be seated with the heating chamber 64 disposed over the holes 62. The holes or heating passages 62 allow the heat to be directed the upper part of the bowl.

Figures 23, 24:
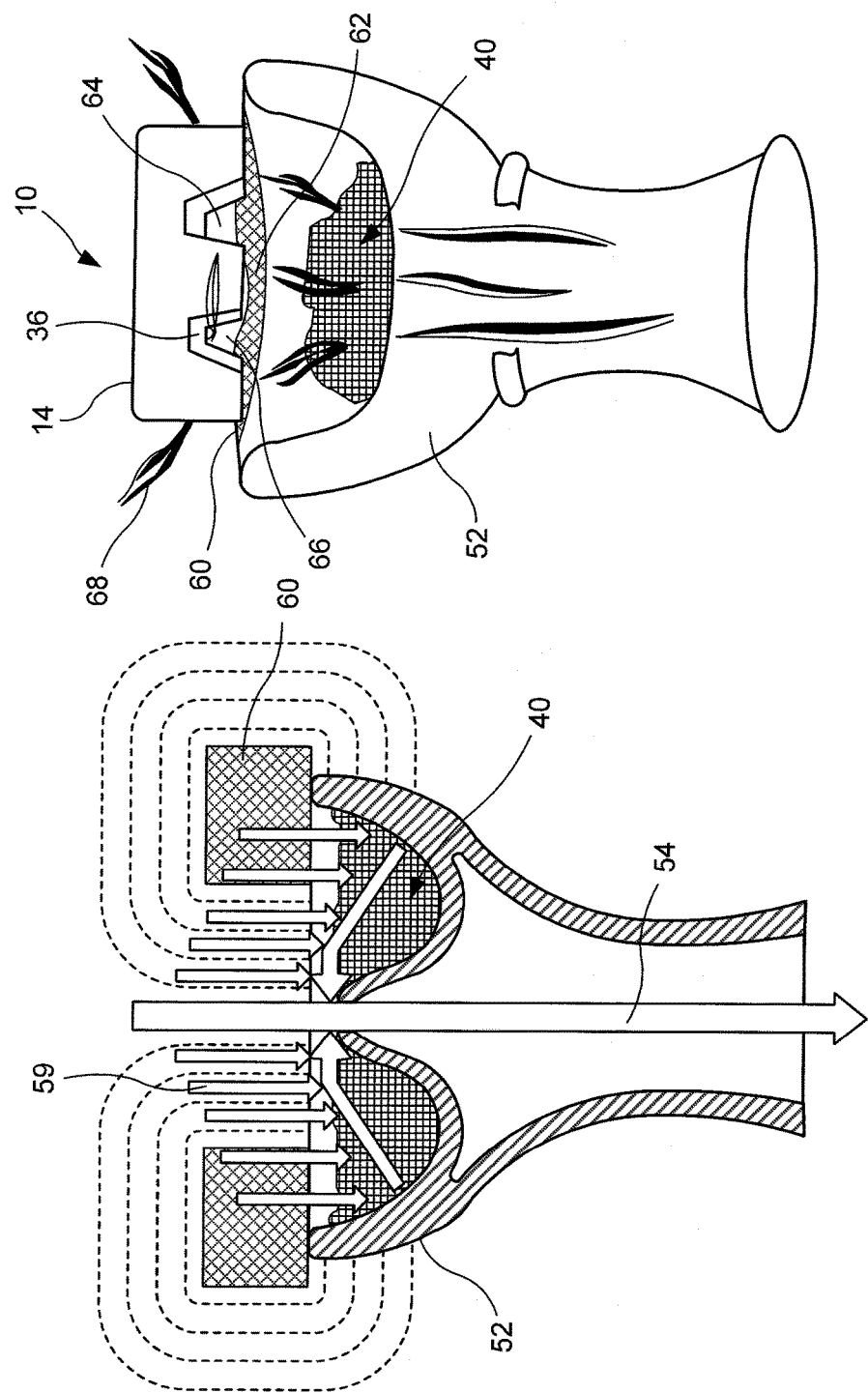
FIG. 23 is a schematic diagram illustrating heat transfer between the charcoal article and the bowl containing a tobacco mixture.
FIG. 24 illustrates formation of the airstreams between the heating chamber of the charcoal article and interior of the bowl containing the tobacco mixture further improving temperature distribution within the system of the invention.

When a smoker inhales through the hose 58, due to the pressure differential, air is pulled through the multiple channels 22 into the interior of the heating chamber 64. As illustrated in FIGS. 23 and 24, due to the multiple air entries into the heating chamber 64 and due to the semi-spherical interior of the article inner chamber 36, swirls or vortexes are formed in the heating chamber 64 by the air streams entering the chamber. This enhances temperature distribution between various legs/prongs 20 and the inner chamber 36 of the charcoal fuel article 10. Through the heating passages 62 formed in the foil, the heated air streams enter into the interior of the bowl 52 holding the tobacco. The hot air, heated by the charcoal article 10 vaporizes the tobacco without burning it. The vapor is passed down through the body tube 54 that extends into the water in the jar 56. It bubbles up through the water 57, losing heat, and fills the top part of the jar, to which the hose 58 is attached. When a smoker inhales from the hose 58, smoke passes into the lungs, and the change in pressure in the jar 56 pulls more air through the channels 22 into the heating chamber 64, continuing the process.

In the invention, the air passages or channels 22 provide the required pathway for air to pass over lower surface while charcoal article 10 is being used. More specifically, each time a user breathes in through the hookah pipe, air is pulled through the channels 22 into the heating chamber 64, thereby feeding the chamber with heat-maintaining air. As indicated earlier, since streams 59 of air enter the heating chamber from various directions of the respective channels 22, these streams upon entering the chamber 64 from swirls/vortexes directed along the semi-spherical inner chamber. Mixing the heated air in the swirls/vortexes further improves and stabilizes temperature distribution among various parts of the charcoal article 10 and the heating chamber 64.

In the invention, when a smoker inhales, the heated air mixture is transferred through the heating passages 62 in the foil 60 directly from the heating chamber 64 into the bowl 52 interior filled with the tobacco mixture. This causes direct and more even heating of the tobacco. More specifically, the air mixture heated in the heating chamber 64 is passed directly into the bowl 52 interior and more evenly distributed within the inner surface of the bowl. Thus, in the invention, the streams of heated air mixture passing directly from the heating chamber 64 through the foil heating passages 62 into the bowl 52 interior is the main source of tobacco heating. This causes more even heating of tobacco mixture, not only along its exterior surface, but also within the body of the tobacco mixture. It will be discussed below that this approach is quite different to the prior art, wherein the infrared irradiation is the main source of heat transfer.

The charcoal article of the invention 10 also provides the advantage of distancing the hottest top part of 14 of the charcoal article 10 from the heating platform 60 and the immediately underlying tobacco 40. Hookah smokers are aware of the scorching that can occur when hot charcoals are placed too close to the hookah tobacco mixture. The present invention minimizes this problem by providing the charcoal article 10 having a main active portion spaced from the foil or heating platform 60 by the operational gap 66, and therefore also distanced from the tobacco.

In the invention due to the advantageous design of the heating chamber 64 the smoking matter or tobacco 40 is heated to a desired temperature of approximately 120-150° C. The temperature above 150° C. is not recommended causing burning of the tobacco. The temperature below 120° C. does not produce the required smoke. The above-discussed temperature range is provided for orientation purposes only. This is because such temperature range depends on various factors including size and material of the bowl, amount and type of tobacco, quantity and size of the charcoal article, thickness of the foil and quality and dimensions of the openings/apertures within the foil.

In the process of heat transfer between the charcoal article, the foil or heating platform 60 and the smoking matter 40, it is possible to identify various methods, each having its own advantages and disadvantages.

1) Upon use of the prior art charcoal articles, heat is often transfer directly from the charcoal through the foil to the tobacco by means of infrared radiation generated by the burning charcoal. Use of charcoal articles having conventional configuration causes irregular heating of tobacco. The tobacco positioned directly under the respective pieces of charcoal has a maximal temperature causing undesirable burning of a tobacco. In the area between various pieces of charcoal, tobacco is not heated to the required temperature and desirable taste of tobacco is not produced. The depth of penetration of the heat radiation into the body of tobacco is insignificant. Therefore, it is difficult to achieve even heat distribution, as well as the required tobacco heating. In the prior art this drawback is often alleviated by periodical shifting of charcoal on the surface of foil or directing a stream of cold air into the bow containing a tobacco mixture. These techniques, although popular among hookah smokers, require additional manipulations and are quite inconvenient.

2) In this approach the heat is transferred to tobacco by means of heating the bowl by the ignited coal. Heat from the coal is transferred to the bowl through the infrared radiation. In this manner, the tobacco mixture is heated from the bottom. Although, this method of heat transfer provides some improvements, the above-discussed drawbacks are not totally eliminated. This method transfers insignificant heat quantity which is dependent on the material and size of the bowl. These factors are not always possible to control due to the substantial number of the bowl manufacturers.

3) Heat is transferred by movement of air surrounding the charcoal and the bowl containing tobacco, also known as convection. This occurs when the stream of air passing at a conventional charcoal article is heated and transfers the obtained heat to the tobacco. The depth of penetration of the heated air into the tobacco is substantially greater compare to the heat transfer by radiation. In this method, the tobacco is heated more evenly. However, in the prior art this method transfers reduced quantity of heat, since the heated air is typically directed in the upward direction. Furthermore, cold air passes through the apertures in the foil positioned remotely from the coal. In the prior art these drawbacks can be reduced by positioning a cover above the bowl, which prevents heat dissipation in the upward direction and increases the air temperature. Unfortunately, positioning of the cover also increases the heat transfer by means of irradiation.

Further more, in the prior art charcoal articles are typically provided in the form of solid cubes or tablets. This shape of charcoal does not contribute to passage of air under the articles and the entire air stream passes away from the bottom area thereof. Thus, no passage of air under the coal has taken place. In the area under the coal, the heat is transferred by irradiation. Thus, cold air streams passing through the bowl cools down tobacco heated by infrared radiation.

In the invention due to the plurality of spaced from each other prongs/feet 20, the top main active portion of the charcoal body 12 is elevated above the foil or heating platform 60. This design creates the operational gap 66 between the main active part of the coal article and the heating platform or the foil 60. Thus, the heat transfer through irradiation is reduced. Furthermore, formation of the heating chamber 64 between the inner coal chamber 36 and the heating platform or the foil 60 facilitates higher and more even heating of air. All this enhances heat transfer through the convection by the airstreams. The novel design of the charcoal article 10 of the invention enables the user to reduce heat quantity transferred by means of infrared irradiation and to increase the convection heat quantity generated by the airstreams.

The following are among essential advantages of the charcoal article 10 of the invention over the prior art charcoal articles.

1) Multiplicity of the legs/prongs 20 elevates the main active portion of the article above the heating platform or the foil 60. This design also substantially reduces the area of direct contacts between the article 10 and the heating platform 60, so as to minimize the heat transfer by irradiation.

2) In the invention, plurality of legs/prongs 20 are separated by the channels 22 disposed opposite to each other. In the resulted heating chamber 64 the airstreams are directed towards the central area thereof. In this manner, swirls of airstreams are developed intensifying mixture of heated air streams. Thus, within the chamber 64 the air is heated to an elevated temperature more evenly, further improving the role of airstreams in the heat transferring step due to the convection.

3) Multiple legs/prongs 20 separated by the channels 20 reduce direct contacts between the charcoal article 10 and the foil 60. In this manner, resistance to the airstream passing from the heating chamber 64 into the bowl 52 is reduced. This further increases the efficiency and distribution of the airstreams resulted in the enhanced heat transfer by means of airstream convection. The resistance to the smoking of hookah is also reduced, since less energy should be applied by a smoker upon inhaling the tobacco through the hoses 58.

In the invention, upon inhaling, the streams of the heated air from the heating chamber 64 are directed through the heating passages 62 within a foil into the bowl 52 with a tobacco mixture, so that the tobacco is heated primarily by means of convection more evenly with respect to the surface of the tobacco as well as with respect to the depths thereof.

Thus, in the invention, the main source of heating is by means of the convection due to movement of hot air streams and not due to the infrared radiation used mainly by the prior art. Convection causes more even distribution and heating of tobacco mixture and, which is very important, causes full flavor recovery of the smoking matter or tobacco by a smoker. Undesirable overheating of the tobacco is substantially minimized.

The main application of the charcoal article of the invention is for use in a traditional hookah tobacco pipes. However, it should be understood that the presently disclosed charcoal articles 10, 110 and 210 may be used in other applications, particularly where it is desired that the charcoal rest on a flat surface or substrate.

What is claimed is:

1. A charcoal article, comprising:
a substantially cylindrical body extending between top and bottom portions,
a base surface provided between said top and bottom portions,
at least three legs disposed circumferentially about said cylindrical body and extending outwardly from said base surface toward said bottom portion, each of said at least three legs having a substantially pyramidal configuration defined by:
a first and a second side wall each extending at an obtuse angle away from said base surface towards said bottom portion and being angled relative to each other;
a peripheral wall extending at an obtuse angle away from said base surface towards said bottom portion, said peripheral wall interconnecting said first and said second side walls; and
an end wall interconnecting said first and said second side walls and said peripheral wall, said end wall being disposed parallel to said base surface;
at least three channels, each said channel separating a pair of adjacent legs, each said channel being defined by one of said side walls of each of said adjacent legs and a portion of said base surface disposed therebetween,
a recess extending inwardly from said base surface into the body of the charcoal article toward said top portion thereof, said recess being circumscribed by a circumferential wall extending from said base surface toward said top portion of said body of the charcoal article, by said peripheral walls of said at least three legs, and by said channels, and
an inner chamber formed between said peripheral walls of said at least three legs and said circumferential wall of said recess and terminating at an unobstructed ceiling disposed within said body of the charcoal article, said ceiling being parallel to said base surface, said circumferential wall connecting said base surface and said ceiling;
wherein the channels provide a pathway for an air flow to pass over a lower part of the charcoal article, and in use air is pulled through the channels into the heating chamber, thereby feeding the heating chamber the air flow from various directions of the respective channels to form a swirl directed along an inner surface of the inner chamber.

2. The charcoal article of claim 1, wherein:
said peripheral wall of each said leg has an arched configuration.

3. The charcoal article of claim 1, wherein the peripheral walls of the legs and the circumferential wall of the recess are formed as parts of a continuous truncated semi-spherical body.

4. The charcoal article of claim 1, wherein said at least three legs comprise at least four legs, each pair of legs being separated by one of said channels.

5. The charcoal article of claim 1, wherein said at least three legs comprise five legs, each pair of legs being separated by one of said channels.

6. The charcoal article of claim 1, wherein each pair of said at least three channels are angled with respect to one another, and allow for air flow from at least two directions into said chamber.

7. The charcoal article of claim 1, wherein said end walls form a part of said bottom surface.

8. A charcoal article for use with a hookah pipe, said charcoal article comprising:
a body extending between top and bottom portions, said top portion terminating in a top surface and said bottom portion terminating in a bottom surface, said top and bottom surfaces being parallel to one another;
a heating chamber formed at the bottom portion by a plurality of legs disposed about a perimeter of said body and extending outwardly from a base surface toward said bottom surface, the base surface disposed between the top and bottom portions and being parallel to said top and bottom surfaces, at least three channels, wherein each pair of the adjacent legs is separated by one of said channels, wherein each of said plurality of legs is defined by:
a first and a second side wall each extending at an obtuse angle away from said base surface towards said bottom portion and being angled relative to each other;
a peripheral wall extending at an obtuse angle away from said base surface towards said bottom portion, said peripheral wall interconnecting said first and said second side walls; and
an end wall interconnecting said first and said second side walls and said peripheral wall, said end wall being disposed parallel to said base surface; wherein said channels are angled with respect to one another,
a recess extends inwardly from the base surface, into the body of the article and being circumscribed by a circumferential wall, said plurality of legs, and said channels,
an inner chamber defined within the body by walls of the legs and said circumferential wall of the recess and terminating at an unobstructed ceiling disposed within said body parallel to said base surface;
wherein the legs are configured for placement on a bowl of tobacco covered by a foil and having at least one perforation or heating passage, so that the heating chamber is positioned to coincide with or to be located at the perforation or heating passage; and
wherein the channels provide a pathway for an air flow to pass over a lower part of the charcoal article, and in use air is pulled through the channels into the heating chamber, thereby feeding the heating chamber the air flow from various directions of the respective channels to form a swirl directed along an inner surface of the inner chamber.

9. The charcoal article of claim 8, wherein said plurality of legs comprises five legs, each pair of legs being separated by one of said channels.

10. The charcoal article of claim 8, wherein, in use in the hookah pipe, said charcoal article is arranged at a top of the hookah pipe, such that said legs and said channels are disposed downwardly and face an interior of a body of the hookah pipe, and said top surface of the charcoal article faces away from the body of the hookah.

11. The charcoal article of claim 9, wherein:
each said channel is formed by side walls of a pair of adjacent legs and a segment of the base surface positioned therebetween such that each said channel has a trapezoidal cross-section in a direction perpendicular to a length of the channel, and has the same trapezoidal cross section at least three locations along the length of the channel,
the peripheral wall of each said leg has an arched configuration,
said circumferential wall of said recess connect the base surface with the ceiling of said inner chamber, and
said inner chamber is defined by the arched peripheral walls of the legs and the circumferential wall and ceiling of the recess.

12. The charcoal article of claim 11, wherein the peripheral walls of the legs and the circumferential wall of the recess are formed as parts of a continuous truncated semi-spherical body.

13. The charcoal article of claim 8, wherein the air flow is a heat-maintaining air flow.

14. The charcoal article of claim 13, wherein upon a user breathing through the hookah pipe, air is pulled through the channels into the heating chamber, further improving and stabilizing temperature distribution among various parts of the charcoal article and the inner chamber.

15. The charcoal article of claim 14, wherein said air pulled through said channels is directed from the heating chamber downwardly into said hookah pipe.

* * * * *